United States Patent
Kamar et al.

(10) Patent No.: US 11,655,353 B2
(45) Date of Patent: May 23, 2023

(54) GRAPHENE NANOPLATELET MODIFIED SHEET MOLDING COMPOSITIONS

(71) Applicant: Continental Structural Plastics, Inc., Auburn Hills, MI (US)

(72) Inventors: Nicholas T. Kamar, Auburn Hills, MI (US); David J. Krug, Auburn Hills, MI (US); Michael J. Siwajek, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 546 days.

(21) Appl. No.: 16/777,923

(22) Filed: Jan. 31, 2020

(65) Prior Publication Data

US 2020/0165410 A1 May 28, 2020

Related U.S. Application Data

(63) Continuation-in-part of application No. PCT/US2018/044905, filed on Aug. 2, 2018.

(60) Provisional application No. 62/540,744, filed on Aug. 3, 2017.

(51) Int. Cl.
| | | |
|---|---|---|
| C08K 3/04 | (2006.01) | |
| C01B 32/225 | (2017.01) | |
| B05D 1/00 | (2006.01) | |
| C08J 7/04 | (2020.01) | |
| C08K 3/26 | (2006.01) | |
| C08K 7/00 | (2006.01) | |

(52) U.S. Cl.
CPC ............... C08K 3/04 (2013.01); B05D 1/007 (2013.01); C01B 32/225 (2017.08); C08J 7/04 (2013.01); C08K 3/26 (2013.01); C08K 7/00 (2013.01); C01P 2004/24 (2013.01); C08J 2333/04 (2013.01); C08J 2367/06 (2013.01); C08K 2003/265 (2013.01); C08K 2201/011 (2013.01)

(58) Field of Classification Search
CPC ... C08K 3/04; C08K 3/26; C08K 7/00; C08K 2003/265; C08K 2201/011; C08K 3/042; C08K 3/046; B05D 1/007; B05D 1/045; B05D 5/12; C01B 32/225; C01B 32/198; C01B 32/19; C08J 7/04; C08J 2333/04; C08J 2367/06; C01P 2004/24
See application file for complete search history.

(56) References Cited

U.S. PATENT DOCUMENTS

| | | | |
|---|---|---|---|
| 4,260,358 | A | 4/1981 | Mehnert |
| 4,643,126 | A | 2/1987 | Wilkinson et al. |
| 5,100,935 | A | 3/1992 | Iseler et al. |
| 5,268,400 | A | 12/1993 | Iseler et al. |
| 5,854,317 | A | 12/1998 | Rinz |
| 6,780,923 | B2 | 8/2004 | Guha et al. |
| 7,655,297 | B2 | 2/2010 | Guha et al. |
| 7,829,637 | B2 | 11/2010 | Guha et al. |
| 8,017,228 | B2 | 9/2011 | Drzal et al. |
| 8,597,453 | B2 † | 12/2013 | Jang |
| 9,868,829 | B2 | 1/2018 | Guha et al. |
| 2006/0231792 | A1* | 10/2006 | Drzal ............. C08K 7/00 524/495 |
| 2007/0125493 | A1* | 6/2007 | Jang ............. B29C 43/222 156/324 |
| 2009/0311436 | A1* | 12/2009 | Drzal ............. C08K 9/08 252/511 |

OTHER PUBLICATIONS

Li, Bin, et al., "Review on polymer/graphite nanoplatelet nanocomposites," Journal of materials science, 2011, vol. 46, pp. 5595-5614—See abstract: p. 5603; and table 2.

Debelak, Bryan, et al., "Use of exfoliated graphite filler to enhance polymer physical properties," Carbon, 2007, vol. 15, pp. 1727-1734—See abstract and p. 1733.

Cai, Minzhen, et al., "Methods of graphite exfoliation." Journal of Materials Chemistry, 2012, vol. 22, pp. 24992-25002—See the whole document.

Chung, D.D.L. J Mater Sci (2016) 51: 554. doi:10.1007/s10853-015-9284-6 (Abstract only).

\* cited by examiner
† cited by third party

*Primary Examiner* — Doris L Lee
(74) *Attorney, Agent, or Firm* — MaxGoLaw PLLC

(57) ABSTRACT

A sheet molding compound (SMC) is provided with superior conductivity properties based on the use of graphitics. A process for exfoliation of GnP and turbostratic carbon is also provided. By exfoliating the graphitics, a reduced amount of material can confer comparable properties relative to native GnPs or turbostratic carbon thereby reducing the amount of material usage, but also reducing negative effects to the base resin formulation through inclusion of these additives. Particular utility is found in thermoset resin molding to produce articles that are amenable to electrostatic coating and other surface treatments that rely on surface conductivity and especially in the realm of vehicle body parts.

19 Claims, 4 Drawing Sheets

GRAPHENE NANOPLATELET MODIFIED SHEET MOLDING COMPOSITIONS

CROSS-REFERENCE TO RELATED APPLICATION

This application is a continuation in part of PCT Application Serial Number PCT/US2018/044905, filed Aug. 2, 2018, that in turn claims priority of U.S. Provisional Patent Application Ser. No. 62/540,744, filed Aug. 3, 2018, which is incorporated herein by reference.

FIELD OF THE INVENTION

The present invention relates generally to molded articles rendered electrically conductive and methods of forming the same.

BACKGROUND OF THE INVENTION

Allotropy is the property of some chemical elements to exist in two or more different forms, in the same physical state (i.e., different solid, liquid, or gas forms), known as allotropes of these elements. Allotropes are different structural modifications of the same element, where the atoms of the element are bonded together in a different manner. The most common and familiar example of an allotrope is the element carbon. Among the allotropes of $sp^2$-hybridized carbon are fullerenes, where the carbon atoms are bonded together in spherical, tubular, or ellipsoidal formations; graphite, where the carbon atoms are bonded together in infinitely extending sheets of a hexagonal lattice; turbostratic carbon, where the sheets of carbon atoms are haphazardly folded, or crumpled together; and graphene, single sheet of graphite.

Graphene is the basic structural element of other allotropes of carbon, including graphite, charcoal, carbon nanotubes, and fullerenes. Graphene has many unusual properties including a high strength that is about 200 times stronger than the strongest steel, as well as a highly efficient conductor of electricity and heat while being nearly transparent. Graphene has proven difficult to use efficiently as a lower energy state exists when successive layers of graphene stack to create van der Waals interactions between adjacent layers.

Exfoliated graphite nano-platelets (xGnP) are a type of nanoparticles made from graphite. Nanoparticles are particles between 1 and 100 nanometers in size. The exfoliated graphite nano-platelets include small stacks of graphene layers that are 1 to 15 nanometers thick, with diameters ranging from sub-micron to 100 microns.

Exfoliated graphite nano-platelets are extremely electrically conductive, and composite materials made with polymers, illustratively including plastics, nylon, or rubber, and can be made electrically or thermally conductive with the addition of small amounts of xGnP. xGnP has a percolation threshold for conductivity of 1.9 wt % in thermoplastic matrix. At densities of 2-5 wt %, conductivity reaches sufficient levels to provide electromagnetic shielding. xGnP can also be combined with glass fibers or other matrix materials to provide sufficient conductivity for electrostatic painting or other applications requiring electrical conductivity. Furthermore, as opposed to materials like carbon black, xGnP improves mechanical properties of most composites, particularly stiffness and tensile strength. Elastomeric compounds have been shown to experience increased life and reduced surface wear when reinforced with xGnP.

Owing to customer visibility and environmental exposure encountered by certain vehicle parts, a high-quality surface and paint finish is demanded that is commonly referred to in the industry as a high gloss finish. To provide a high-quality paint surface vehicle components such as doors, hoods, quarter panels, and other vehicle skin parts may be electrostatically painted. Electrostatic painting generally requires that the part be electrically conductive and support an electrical potential sufficient to attract oppositely charged paint droplets to the surface of the part. However, in many applications the polymer matrix used to make the part is not inherently conductive. As described in prior publications to make certain polymers electrostatically conductive the materials must be modified or enhanced. Electrically conductive polyester molding compositions suitable for electrostatic painting have been described in U.S. Pat. No. 7,655,297, the disclosure of which is incorporated herein by reference. As disclosed therein polymer compositions can be provided with a surface conductivity by adding conductive materials to the polymer composition.

Care in the formation of the surface of a molded article is needed to make a high gloss automotive vehicle surface. Thermoset resins, such as sheet molding composites and bulk molding composites tend to adhere to mold surfaces which can detrimentally affect surface quality. To promote the molding process, manufacturers often resort to mold release agents that facilitate the release of the molded article. Internal mold release agents such as magnesium stearate and stearic acid have been used in sheet molding composites and bulk molding composites to promote release of the molded article from the mold. While mold release agents can provide both a physical and/or chemical barrier as a means of separation between the materials being molded and the mold surface, the mold release agents alone do not provide a conductive surface sufficient for electrostatic painting. As described in prior publications carbon black, graphite and other conductive materials can be added to the bulk composition to improve conductivity. The process of distributing a conductive material throughout the bulk material may be wasteful, as material addition to the bulk material may not serve a useful purpose. When changes to the base resin are needed, the resin mixture often has to be reengineered and retested as to handling, cure and shrinkage characteristics. Engineering a new resin mixture can be time consuming, as is the resulting testing. Changes to formulate the mixture can also lead to tradeoffs in another properties. These tradeoffs can invariably lead to a need for re-optimization of the molding process. This approach can add significant cost and time.

While xGnP has been found to make composite materials have electrostatic properties, xGnP is presently expensive to produce, and the aforementioned problems of distributing a conductive material throughout the bulk material is typically wasteful. Therefore, the use of xGnP as a source for forming conductive polymers has met with limited success.

Thus, there exists a need for a molding composition for thermoset resins of sheet molding composites or bulk molding composites that allows for xGnP to be incorporated into a conventional thermoset resin composition at lower loading to modify characteristics such as mold release, electrical conductivity, or both. There also exists a need for a molding composition than includes xGnP and still retains a high-quality surface that is amenable to finishing to an automotive high gloss while imparting surface electroconductivity.

SUMMARY OF THE INVENTION

A thermoset molded article is provided having a surface region and a central bulk region that includes a thermoset resin formulation cured to define a matrix with a shape of the article, and a graphitic filler dispersed in the matrix.

A method is provided for electrostatically coating an article that includes forming a thermoset article with a graphitic filler dispersed in the matrix of the article, applying an electrical bias to the article to create a biased article, and exposing the biased article to a coating precursor having an opposing electrical charge relative to the electrical bias. A sufficient time is then allowed for the coating precursor to form the electrostatic coating on the article.

A method is provided for forming an exfoliated graphitic that includes dispersing a graphitic in a solvent based dispersion or solution of a polyelectrolyte having a first counterion under conditions to allow the polyelectrolyte to intercalate to form a mixture, and exposing the mixture to a second counterion to form the exfoliated graphitic.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
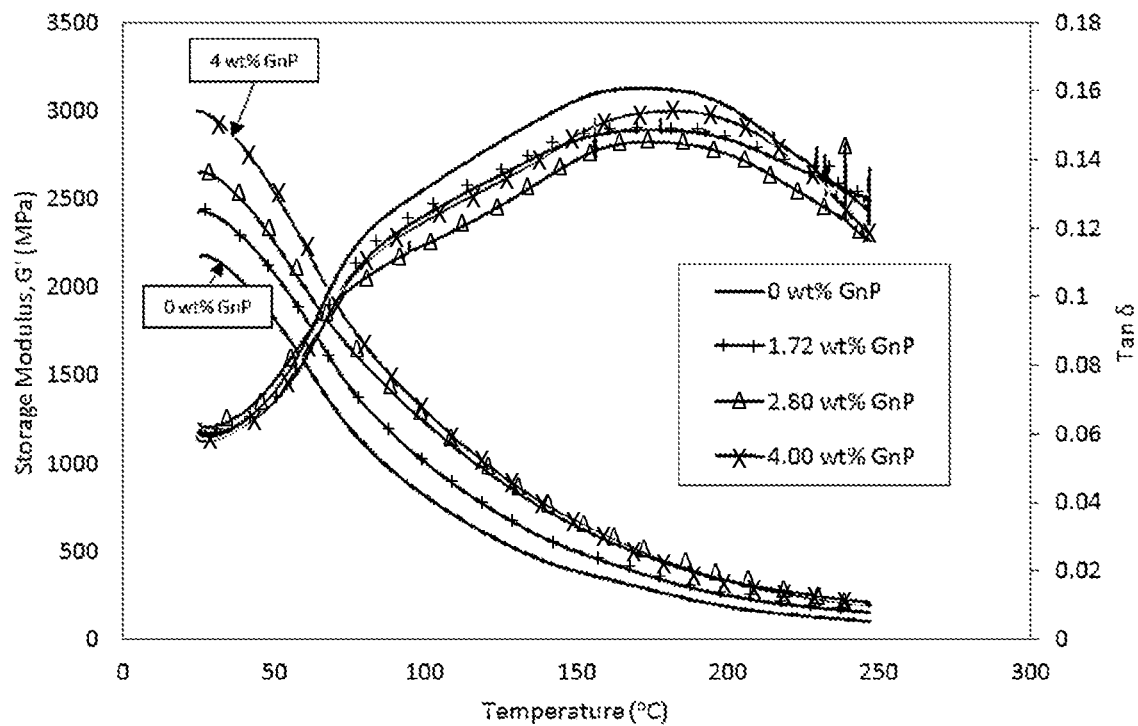
FIG. 1 is a graph showing storage modulus, G' (MPa) and Tan δ as a function of graphite nanoplatelet (GnP) loading (0, 1.72, 2.80, and 4.00 total weight percent) in cured SMC paste, in accordance with the present invention.

The present invention has utility as a sheet molding compound (SMC) with superior conductivity properties based on the use of graphitics. A process for exfoliation of GnP and turbostratic carbon is also provided. It has been discovered that by exfoliating graphitics, that a reduced amount of material can confer comparable properties relative to native GnPs or turbostratic carbon thereby reducing the amount of material usage, but also reducing negative effects to the base resin formulation through inclusion of these additives. Particular utility is found in thermoset resin molding to produce articles that are amenable to electrostatic coating and other surface treatments that rely on surface conductivity and especially in the realm of vehicle body parts.

As used herein, a graphitic is defined to include unmodified graphite nanoplatelets (GnPs), exfoliated graphite nanoplatelets (xGnPs), turbostratic carbon, exfoliated turbostratic carbon and combinations thereof, the average maximal linear dimension of the graphitics being between 1 and 250 microns, with average layer thicknesses of from 5 to 20 nanometers.

As used herein, maximal linear dimension is the longest linear extent from among the three orthogonal axes: X-Y-Z for a given particle. By way of example, a spherical particle has a maximal linear extent that is the same in all three orthogonal directions and corresponds to the particle diameter, while a graphene layer has a maximal linear extent along the longest linear direction in the plane of the layer.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

According the present invention, a conventional SMC resin formulation is modified with the inclusion of a graphitic. The graphitic is added in an amount of from 0.03 to 5 total weight of an uncured resin formulation. The total weight percentage being determined prior to inclusion of reinforcing fiber filler, such as glass or carbon fibers that are routinely added thereto to enhance the strength of the resulting molding articles.

A principal component of an SMC or BMC formulation of the present invention is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites. Typical SMC and BMC formulations are described in U.S. Pat. Nos. 4,260,358; 4,643,126; 5,100,935; 5,268,400; 5,854,317 and 6,780,923. A particularly preferred SMC formulation is detailed in U.S. Pat. No. 7,829,637.

Vinyl ester resins are also typically employed in SMC or BMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. It is appreciated that more than one type of monomer can be used in a molding composition. The monomer provides benefits including lower prepolymer viscosity and thermosetting without formation of a volatile byproduct. Monomer is typically present up to 18.5 total weight percent of a molded article.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent absent fiber fillers.

The inventive molding composition preferably includes a particulate filler. Particulate fillers operative in such molding compositions illustratively include calcium carbonate; calcium silicate; alumina; ATH; silica, such as hollow microspheroids; talcs; dolomite; vermiculite; diatomaceous earth; kaolin clay; graphite; metal; and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent of the molding composition total weight. Typical fillers filler have maximal linear extents of from 0.1 to 50 microns. It is appreciated such particulate fillers are operative in conjunction with the graphitics detailed herein.

Hollow microspheroids are detailed in U.S. Pat. No. 9,868,829 and are operative herein with or without surface derivatization. Reactive groups that can extend from a microspheroid surface to interact with a surround uncured resin includes a tertiary amine-; hydroxyl-; imine-; an ethylenic unsaturation, such as an allyl- or acryl-; or cyanomoiety. Surface activating agent molecules that bond to a glass microspheroid are an alkoxysilane where the silane is reactive with the silica surface of the microspheroid. Representative alkoxysilane surface activating agents for the micro spheroid illustratively include: 3-aminopropyltrimethoxysilane, 3-aminopropyltriethoxysilane, 3-glycidoxypropyltrimethoxysilane, 3-glycidoxypropyltriethoxysilane, (3-glycidoxypropyl) bis(trimethylsiloxy)methylsilane, (3-glycidoxypropyl)methyldiethoxysilane, (3-glycidoxypropyl) dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, methacryloxypropyltrimethoxysilane ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl)tetrasulfide, and combinations thereof.

In certain inventive embodiments, the filler particle size is matched to that of the graphitic such that interstitial filling of voids associated with one of the filler or graphitic is filled by the other. In still other inventive embodiments, the graphitics are larger in maximal linear extent than the filler particle size to an extent that a filler particle can reside in an interstice between closely packed graphitic domains. By way of example, four coplanar 18 micron spherical calcium carbonate particles packed in an article formed from an inventive molding composition matrix to create a 7.4 micron diameter interstice. A graphitic spherical particle having a 5 micron diameter is well suited to fill interstitial spaces formed between the larger filler particles of the present invention. One of skill in the art can readily calculate interstitial dimensions by geometric techniques associated with crystallography. Assuming a filler average radius of r for a group of contiguous particles forming a four spheroid intersection interstice, the maximal linear extent of a graphitic domain capable of filling the interstice is less than or equal to a diameter D given by:

$$D \leq 2\sqrt{2r^2 - 2r}$$

While not intending to be bound by a particular theory, it is surmised that interstitial dispersion of small particles within a grouping of larger particles inhibits formation of an inhomogeneous region rich in filler. Inhomogeneous filler regions with comparatively weak interactions with a surrounding cured matrix are believed to promote crack propagation and thereby weaken the resulting article. As conductivity associated with graphitics according the present invention is believed to occur through a percolation model of charge "hopping" from conductive domains, the ability to disperse graphitics through exfoliation, dispersion, or a combination thereof improves the properties of an article produced by the present invention.

It is appreciated that curable compositions other than SMCs and BMCs benefit from the inclusion of graphitics sized to fill interstices between adjacent filler particles. A graphitic-filler size ratio to provide interstitial packing is employed in curable compositions also illustratively including epoxies, polyurethanes and polyureas.

A fiber filler is typically added to provide strength relative to a particulate filler in SMC and BMC formulations used to form articles that require structural performance in vehicle parts and construction applications. Fiber fillers operative herein illustratively include glass, carbon, polyimides, polyesters, polyamides, and natural fibers such as cotton, silk, and hemp. In many embodiments, the fiber filler is glass fiber in the form of chopped glass strands, alone or mixed with carbon fibers. Typical chopped strands are provided in lengths ranging from 5 to 50 millimeters. Fiber fillers are typically present from 0 to 80 weight percent after mixing with an SMC or BMC resin formulation containing the other additives mentioned herein.

A mold release agent is typically provided to promote mold release. Mold releases include fatty acid salts illustratively including oleates, palmitates, stearates of metal ions such as sodium, zinc, calcium, magnesium, and lithium. A mold release is typically present from 0 to 5 total weight percent of the formulation absent fiber fillers.

In some embodiments, there is provided a thermoform resin composition including a conductive graphene oxide with at least one functional group associated with graphene oxide. A particular graphene oxide is a graphene oxide including a long chain fatty acid metal. The graphene oxide may include a metal ion. The modified graphene oxide can have a conductivity greater than $1 \times 10^{-3}$ S/m. The modified graphene oxide may be used as a mold release agent.

As defined in this disclosure conductive means a conductivity of $1 \times 10^{-3}$ S/m or greater. Thermoform resins include both thermoset and thermoplastic resins. Sheet molding composites are thermoset resin compositions reinforced with glass, carbon, or natural fibers. A mold release agent is an agent that imparts lubricity or surface dynamics in an amount sufficient to increase mold release capability over a comparable material lacking such material.

In a first embodiment there is provided a graphene oxide including a graphene oxide combined with an organometallic to produce a functionalized graphene oxide. The functionalized graphene oxide may further include on or more metals. An exemplary organometallic includes a long chain fatty acid metal. The functionalized conductive graphene oxide can have a conductivity greater than $1 \times 10^{-3}$ S/m. In use the functionalized conductive graphene oxide may be added to a thermoform molding composition to enhance surface conductivity and/or aid as a mold release agent. The functionalized conductive graphene oxide finds particular use in sheet molding composite applications.

Graphene oxide ("GO") may generally be represented by the following:

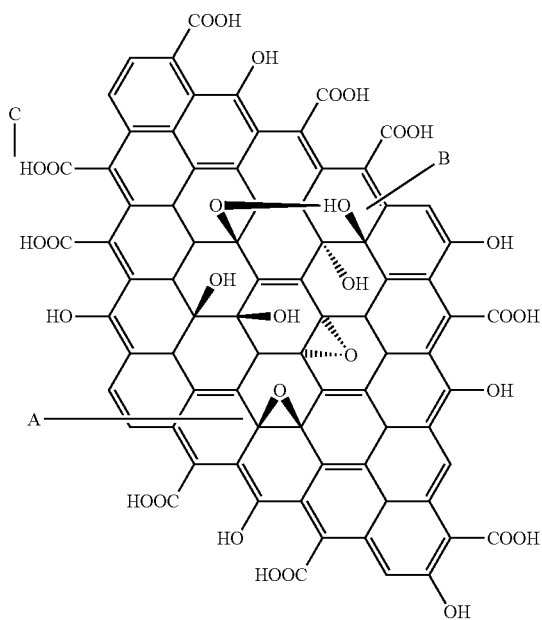

Graphene oxide platelets have chemically reactive oxygen functionality, such as carboxylic acid, groups at their edges (according to the widely accepted Lerf-Klinowski model), and epoxy and hydroxyl groups on the basal planes. One approach to the chemical modification of graphene oxide is to utilize reactions of these groups to selectively functionalize one site over another. At one extreme graphene oxide maybe electrically insulating due to its disrupted sp2 bonding networks. Because electrical conductivity may be provided by functionalizing graphene oxide in accordance with this disclosure, the product of this reaction may be a functionalized conductive graphene oxide.

Conductive properties in the surface of a molded article may be obtained with a sufficient amount of functionalized conductive graphene oxide. For example, 5 percent or more by weight of a functionalized conductive graphene oxide per weight of resin mixture may be sufficient. A sufficient amount can be provided with a functionalized conductive graphene oxide having a conductivity from $1 \times 10^{-3}$ to 10 S/m at 20° C. Conductive properties in the surface of a molded article may also be provided with a functionalized conductive graphene oxide having a conductivity of 1 S/m or greater, $1 \times 10^2$ S/m or greater, $1 \times 10^5$ or greater S/m or anywhere in between depending upon the application and desired outcome. Likewise surface conductivity of the thermoformed article may be achieved with a conductivity of 1 S/m or greater, $1 \times 10^2$ S/m or greater, $1 \times 10^5$ or greater S/m or anywhere in the range using a functionalized conductive graphene oxide.

The modified or functionalized conductive graphene oxide may be made by combining a metal stearate and graphene oxide. The metal stearate may be combined at the carboxyl group of a graphene oxide (as represented by region C of the graphene oxide representation above) to create a modified or functionalized graphene oxide of a mixed metal stearate. Besides metal stearates other organometallics can be used including fatty acids other than saturated $C_{17}$, including myristoleic, palmitoleic, sapienic, oleic, elaidic, vaccenic, linoleic, linoelaidic, arachidonic, eicosapentaenoic, erucic, and docosahexaenoic. These are represented by the general formula, M-FA$_2$, which is intended to include M-St$_2$.

Metallic stearates have the general formula M-St$_2$. Metallic stearates are compounds of long-chain fatty acids with metals of different valences. Stearate starting material may be produced from organic raw materials. Metal stearates may be made using chlorinated hydrocarbons or vegetable and mineral oils and waxes. The stearate starting materials by themselves do not provide a sufficient conductive medium for electrostatic painting. Metallic stearates may be selected from the metallic stearates of calcium, magnesium and zinc. For example:

Ca-St$_2$ can be represented by the formula:

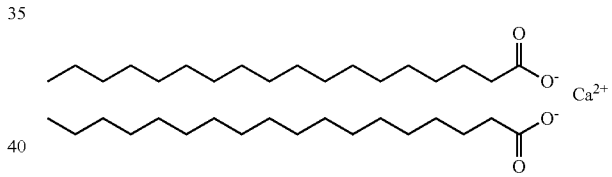

and may be produced by the reaction:

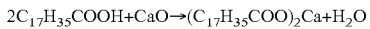

Graphene oxide may be modified to include at least one functional group. The at least one functional group may be a substituted metallic stearate wherein the metal stearate M-S2 is modified to include a graphene oxide in place of one of the stearates. The modified graphene oxide may be represented by the general formula GO-M-FA wherein M-FA is selected from the group of metallic fatty acid salts (such as stearates) including one or more of calcium, magnesium and zinc, and other metals that chelate to carboxyl groups with a 2+ valency state.

The formation of a mixed metal stearate graphene oxide may be provided by reaction of a metal stearate in the presence of an amine or chelating agent and in the presence of graphene oxide. Metallic stearates may be provided in any suitable form, including fine powders, flakes, or granules. The functionalized graphene oxide metal stearate may be used as a lubricant and/or release agent. The functionalized graphene oxide metal stearate may be hydrophobic. Without desiring to be bound by theory it is postulated that in use the metal of the modified metal stearate graphene oxide may compete with the metal ions present in the compositional network to reduce the number of high energy sites available for bonding at the metal surface of the mold. As the metal surface energy is reduced, mold release can be improved.

In an exemplary embodiment an alkali earth (Mg or Ca)-stearate (M-St$_2$) is modified to include a graphene oxide in place of one of the stearates (St). The resulting molecule is expected to bring enough graphene oxide into proximity with the surface to exceed the percolation threshold so electrons could jump from one graphene oxide molecule to a contiguous one to achieve surface conductivity. This is expected to result in efficient usage of graphene oxide without interfering with conventional resins (unsaturated polyesters and polyvinyl esters).

In use the functionalized graphene oxide may be added to a thermoform resin composition. Adding a functionalized conductive graphene oxide to a thermoform resin composition can help to facilitate electrostatic painting and can aid in making a body panel with a class A automotive finish.

In another embodiment there is provided a thermoform resin composition having a bulk region and a surface region beyond the bulk region wherein the surface region and bulk region have different final product, compositional make-up. In this embodiment the functionalized conductive graphene oxide is present in an amount in the surface region sufficient to render the surface conductive enough to be electrostatically painted. By having a mold release with a higher concentration near the surface region in comparison to the bulk region, the addition of mold release may not essentially affect viscosity of the base resin composition thereby avoiding negatively impacting mold flow characteristics. As designed the surface region of the thermoform molded article may have a concentration of the functionalized conductive graphene oxide greater than that of the bulk region. This can be made possible by functionalizing the graphene oxide with a structure that tends to separate from the bulk mixture or resist dispersion during the molding operation. As proposed, an exemplary functional structure is a metal organic and a more exemplary functional structure is a metal stearate. An inventive compound of the formula GO-M-FA is typically present in a thermoset resin from 0.05 to 5 total weight percent. Without intending to be bound to a particular theory, it is believed that GO-M-FA functions in a manner similar to a conventional metal stearate mold release with the proviso that surface conductivity is modified.

Graphene oxide, GO is commercially available or obtained from prepared processes such as chemical exfoliation of graphite with mineral acid and permanganate. The resultant suspension is washed and filtered to remove residual graphite and oxidizing agents. The resulting graphene oxide is dried to a flowable powder.

The thermoform molded article may be a thermoset resin. Suitable thermoset resin compositions include unsaturated polyesters or polyvinyl esters. A suitable composition of the thermoform resin mixture may include one or more enhancing ingredients including film formers, catalysts, binders, crosslinking agents, flow aids, catalysts, fillers, dyes, pigments, conductive particulates, and so forth. Particular advantage may be had in using the functionalized graphene oxide as a mold release agent with a sheet molding composite in addition to the one or more of the enhancing ingredients. An exemplary mold release agent is a functionalized conductive graphene oxide including a fatty acid metal or metal stearate. The thermoform molded article may also include a metal ion in addition to the metal stearate.

As generally described above the graphene oxide may include one or more metals, M'. The metal, M' may be added to increase conductivity. To make graphene oxide with one or more metals graphene oxide can be reacted with a chelating agent in the presence of metal ions. Suitable metals include those having a conductivity of greater than $1 \times 10^3$. Suitable metals, M' may be selected from transition metals, alkaline earth metals or any other suitable metal. Metals may be selected from the group consisting of silver, copper, gold, calcium, tungsten, zinc, nickel, lithium, iron, platinum, tin, and titanium. The resulting molecule may bring enough graphene oxide and/or metal ion into proximity with the surface to exceed the percolation threshold so electrons could jump from one graphene oxide molecule to a contiguous one to achieve increased surface conductivity. By having a conductive graphene oxide it is expected to result in a more efficient usage of graphene oxide while not interfering with conventional resin properties or performance (unsaturated polyesters and polyvinyl esters).

In a specific inventive embodiment M or M' is a graphitic made of graphite nanoplatelets. In a specific inventive embodiment M or M' is a graphitic made of exfoliated graphite nanoplatelets. In a specific inventive embodiment M or M' is a graphitic made of turbostratic carbon. In a specific inventive embodiment M or M' is a graphitic made of exfoliated turbostratic carbon.

The metal ion may be added to the graphene oxide by any suitable means. For example, functionalized graphene oxide may be reacted with a suitable agent in the presence of metal ions to produce a functionalized conductive graphene oxide which can generally be represented by the following formula: FA-M-GO-M'R where FA is a fatty acid salt, M is a 2+ valency metal ion, M' is a metal ion chelated solely by the GO and R is an optional organic chelate for M'. The metal may reside in the +1 or +2 valiancy states. The metal ion may bond with GO through the oxygen generally depicted in the GO representation shown above in region A. GO may be reacted in the presence of metal ions to produce a graphene oxide with a metal ion. Suitable reaction mechanisms include reacting the functionalized graphene oxide and metal ions in the presence of an amine.

The chelating agent R is provided in certain inventive embodiments to inhibit simultaneous chelation of a single metal ion by chelating moiety, such as carboxyl groups by multiple graphene oxide molecules. It is appreciated that some preparations of graphene oxide are able to chelate a given metal ion and a given loading without resort to an additional chelating agent and as a result, R in the above formula is not necessary and would be a nullity in the above formula. The chelating agent R, when present is mondentate, bidentate, or polydentate. Without intending to be bound to a particular theory, stearic effects associated with the separation between carboxyl groups on the graphene oxide molecule make it difficult to complete the coordination number for a given metal ion, leading to solvent coordination or chelation by carboxyl groups of other graphene oxide molecules; resulting is low stability chelation and increased viscosity, respectively. A chelating agent R is provided to displace coordinate covalent bonds with solvent or multiple graphene oxide molecules as needed. As subsequently detailed, titration with a chelating agent is readily accomplished to end points that illustratively include a decrease in viscosity, a color change, or a combination thereof.

A chelating agent R operative herein illustratively includes alkyleneamine acids, such as ethylenediamine disuccinic acid (EDDS), ethylenediamine dimalonic acid (EDDM), and ethylenediamine diglutaric acid (EDDG), ethylenediaminetetraacetic acid (EDTA), diethylenetriaminepentaacetic acid (DTPA), nitrilotriacetic acid (NTA), iminodiacetic acid (IDA), iminotriacetic acid (ITA), ethylenediamine (En), N,N'-diethylenediamine (Den), diethylenetriamine (DTN), diethylenetetramine (Trien), triaminotriethylene amine, citric acid, pyridine, pyrrole, and propylenediamine.

A sheet molding composite panel may be made by adding a mold release agent of the inventive compound to a molding mixture. The mold release agent may be added by any suitable means. The mold release agent may be blended with the bulk material of the pre-mold mixture or disposed about a surface region. The sheet molding composite may then be molded with the mold release agent to produce a molded article. In one embodiment where the mold release agent is added prior to the molding process, the mold release agent is concentrated in a surface region of the molded article. In the case where the mold release agent is a functionalized conductive graphene oxide including a fatty acid metal, the fatty acid metal functionalization can aid in either preventing dispersion into the bulk resin composition or facilitate aggregation of the conductive material in a surface region exterior of the bulk. Concentration of the conductive material in the surface region over that of the bulk region can provide a surface that is conductive with less conductive material in the bulk. By providing less conductive material in the bulk sufficient conductivity may be provided with less conductive material overall. Also by having less conductive material in the bulk the potential impact on resin properties can be reduced and material saving may be realized. As provided the method for producing a sheet molding composite with a functionalized conductive graphene oxide having an additional metal ion can also provide enhanced conductivity in an amount sufficient for electrostatically coating a molded article. The release agent functionality may also allow one to produce a coated article with a class A surface finish, such as one having a class A finish with a Diffracto analysis D number of less than 100.

The resin composition maybe include fillers and other additives including those generally known in the art while enhanced by a conductive mold release agent as disclosed herein.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent absent fiber fillers.

A nanocomposite clay is lipophilic and has domains of a size that do not contribute to the molded article surface roughness. An alkyl quaternary ammonium bentonite nanocomposite clay has domains with maximal linear extent on the order of 50 to 150 nanometers and have a platelet thickness of one to 10 nanometer and are optionally used alone, or in combination with a polymeric moisture reducing additive to enhance the processability of an inventive formulation while decreasing the moisture absorption rate. Such nanocomposite clay is typically present up to 10 total weight percent absent fiber fillers.

It is appreciated that the present invention optionally also incorporates additional additives illustratively including flame retardants, plasticizers, colorants, and other processing additives conventional to the art.

Molding compositions of the present invention are well suited for the rapid production of molded composite articles that have an automotive high gloss finish as determined by ASTM D3928. The present invention is particularly well suited for the production of a variety of products illustratively including bumper beams, vehicle door panel components, automotive floor components, recreational vehicle panels, spoilers, and hoods; and various industrial and consumer product housings such as doors and appliance housings.

According to the present invention, a conventional resin formulation has graphitics dispersed therein. It is appreciated that metering the graphitic into the formulation over a period of time of mechanical mixing promotes dispersion relative to a single charge of graphitics. It is further appreciated that high shear mixing can provide a modest level of exfoliation of the graphitics. The amount of exfoliation appears to be on the order of increasing surface area by from 0.5 to 10 surface area percent.

By incorporating graphitics into a base resin formulation, the resulting molded article has electrical conductivity and improved mold release characteristics relative to the same article absent the graphitics.

In certain inventive embodiments, graphene nanoplatelets (GnPs) as synthesized, or turbostratic carbon, having a maximal linear extent of 5 microns and 175 nm, respectively are dispersed into sheet molding compound (SMC) paste to form electrically conductive polymer composites for direct, electrostatic painting applications. GnPs are commercially available from a variety of vendors. Turbostratic carbons are also commercial available from Sigma-Aldrich under catalog numbers 699624 and 699632. It is appreciated that exfoliated versions of GnP and turbostratic carbon impart like properties and loading of between 3 and 50% by weight of the same graphitic prior to exfoliation.

It is appreciated that a graphitic as used herein is also readily functionalized to add covalently bonded moieties thereto. Methods for do so, illustratively include those detailed in Fang et al. J. Mater. Chem., 2009, 19, 7098-7105; Cao et al. CARBON 48 (2010) 1670-1692. The addition of moieties such as aliphatics to a graphitic impart promote dispersion in a resin formulation, while hydrophilic moieties promote preferential surface segregation of the resulting graphitics, as opposed to homogenous dispersion through the bulk; and cross-linkable moieties such as isocyano- or epoxide allow the graphitic to covalently bond to the resin matrix during cure thereof. It is appreciated that a preferential surface segregation is particularly economic in the amount of the graphitic used when performing electrostatic coating operations.

The molded article may be electrostatic coated using any suitable technique. Suitable electrostatic coating techniques include using liquids and powders. Suitable liquid coatings include water-based and/or organic-based compositions. Using the method as disclosed above sufficient conductivity can be imparted to the article or substrate by incorporating the functionalized conductive graphene oxide prior to electrostatic coating. The electrostatic attraction between the coating material and the grounded article can result in a more efficient, thicker and consistent coverage with less wasted paint.

By creating a greater surface area from a given quantity of a graphitic, and therefore render the resulting molded article electrically conductive using a limited quantity of graphitics, the GnP or turbostratic carbon is exfoliated. Several techniques have been developed for exfoliation as reviewed in Chung, D. D. L. J Mater Sci (2016) 51: 554. doi:10.1007/s10853-015-9284-6. The exfoliation typically involves intercalation of, for example, sulfuric acid, followed by heating. Upon heating, the intercalate is volatilized to cause graphitic layer expansion. However, these existing techniques are both inefficient in the degree of exfoliation and the ability to scale to a manufacturing setting.

The present invention provides a new technique for graphitic exfoliation that uses a polyelectrolyte dispersion or solution as the intercalate. While water is the exemplary solvent for dispersion or dissolution of a polyelectrolyte, it is appreciated that other solvents including ionic liquids, $C_1$-$C_4$ alcohols, acetone and combinations thereof can be used in place of, or a solvent mixtures with water. Without intending to be bound to a particular theory, a polyelectrolyte is more efficient at disrupting van der Waals bonding between adjacent sheets of a graphitic than for example sulfuric acid. Polyelectrolytes operative herein illustratively include polyacrylic acid, polyacrylates, peptides with ionic R groups, poly(sodium 4-styrene sulfonate) (PSSS), and combinations thereof. By ultrasonication or mechanical mixing a graphitic in the aqueous polyelectrolyte to induce intercalation, the resulting mixture is exposed to a source of ions that increase the sphere of hydration around the polyelectrolyte. Ions operative herein include the cations of calcium, magnesium, aluminum, ammonium, and combinations thereof and the anions of sulfate, nitrate, and combinations thereof. It is appreciated that polyelectrolytes cationic sites associate with anions to induce layer exfoliation, while polyelectrolytes anionic sites associate with cations to induce layer exfoliation. It is further appreciated that according to present invention, exfoliation occurs through a combination of hydrostatic and stearic forces, that heating is not required to induce exfoliation.

The present invention is further illustrated with respect to the following non-limiting examples:

Example 1—Native Graphite Nanoplatelet Dispersion in SMC Resin

The electrical conductivity of a conventional SMC resin formulation paste absent fiber fillers is measured before and after cure as a function of GnP concentration. Concentrations of 0, 1.72, 2.80 and 4.00 total weight percent of GnPs having a nominal maximal linear extent of 5 microns are investigated.

Example 2—Characterization of SMC as a Function of Native Graphitic Loading

Observations are made prior to cure that the electrical conductivity of SMC paste increased with increasing concentration of GnPs per Example 1. However, after compression molding of the neat and GnP modified paste, it is found that a concentration of 4.00 total weight percent GnPs gave a surface resistivity sufficient for electrostatic painting applications. Additionally, it is observed that the flexural modulus of cured SMC paste increased with increasing concentration of GnPs up to 2.80 total weight percent; a 32.2% increase in flexural modulus is observed at 2.8 total weight percent GnPs. Dynamic mechanical analysis testing revealed significant improvements in both storage modulus (G') and glass transition temperature (Tg) by incorporation of GnPs. Flexural testing showed that GnPs reduced molded SMC paste strength by 23.5% at 2.8 wt % GnP. Not to be limited to a specific theory, but the improvements in paste modulus may be due to the incorporation of the rigid, high aspect ratio GnPs used herein, while reductions in SMC paste strength may be due to poor adhesion between the inert GnP basal plane and the surrounding polymer matrix.

Thermomechanical and mechanical properties of neat and GnP modified SMC paste are as follows:

Representative storage modulus and Tan δ curves as a function of temperature of SMC paste modified with 0, 1.7, 2.8 and 4.0 total weight percent GnP, respectively, are shown in FIG. 1. The results show that the storage modulus, G' increases with increasing concentration of GnPs across a wide range of temperatures. It is also observed that the value of Tan δ decreased after incorporation of GnPs into SMC paste. Not to be limited to a specific theory, but a reduction in the value of Tan δ at the α transition may be due to dampening resulting from interfacial sliding between the GnPs and the surrounding polymer matrix.

Figure 2:
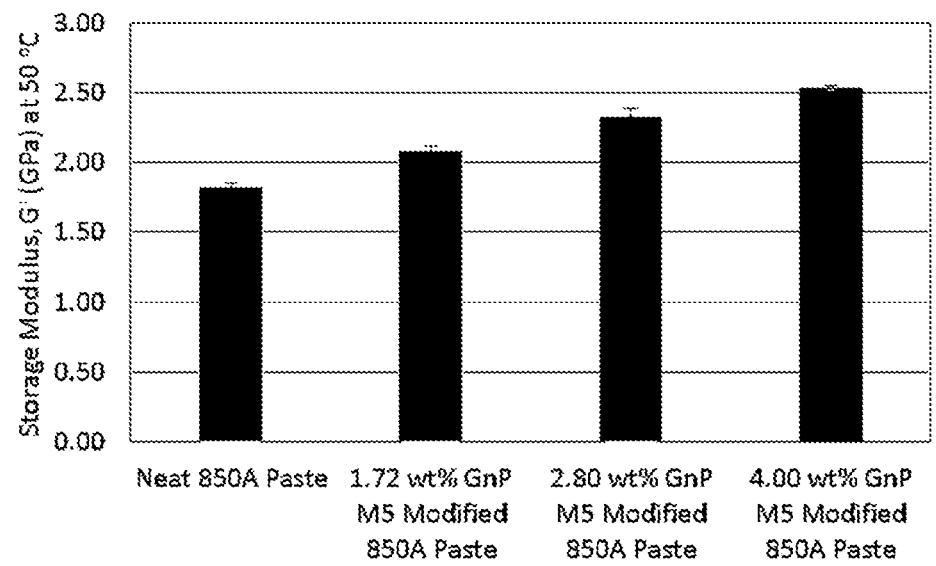
FIG. 2 is a bar graph of average storage modulus, G' at 50° C. for the GnP modified SMC pastes of FIG. 1.

Average storage modulus G' at a temperature of 50° C. for concentrations of GnP of 0, 1.72, 2.80 and 4.00 total weight percent in GnP modified SMC paste, respectively is shown in FIG. 2. As shown in FIG. 2 the increasing use of nanoadditive GnP increases G'.

Figure 3:
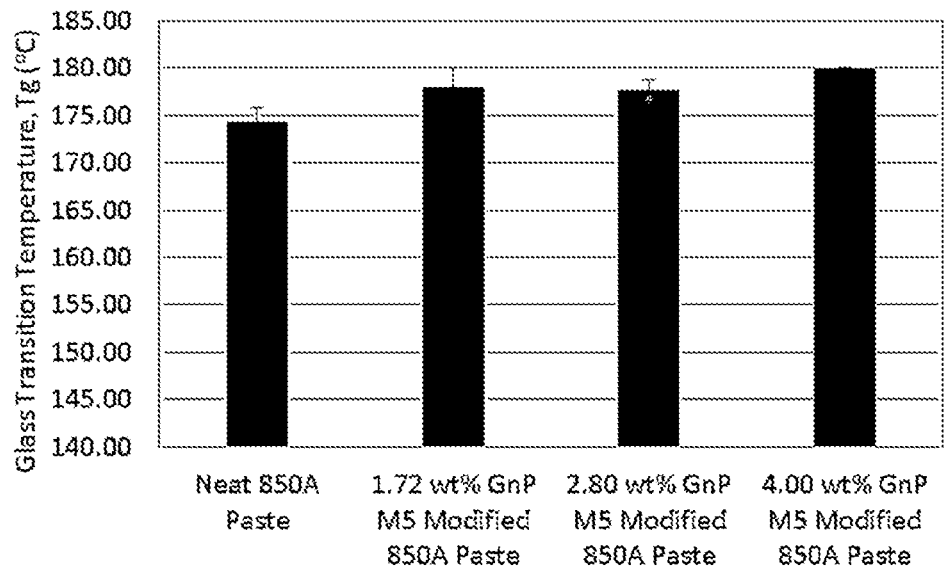
FIG. 3 is a bar graph of glass transition temperature, Tg for the GnP modified SMC pastes of FIG. 1.

FIG. 3 illustrates the glass transition temperature (Tg) for neat and GnP modified SMC paste. Not to be limited to a specific theory, but the GnPs appear to improve SMC paste Tg by a restriction of chain motion by the rigid nanoplatelets at the α transition.

Figure 4:
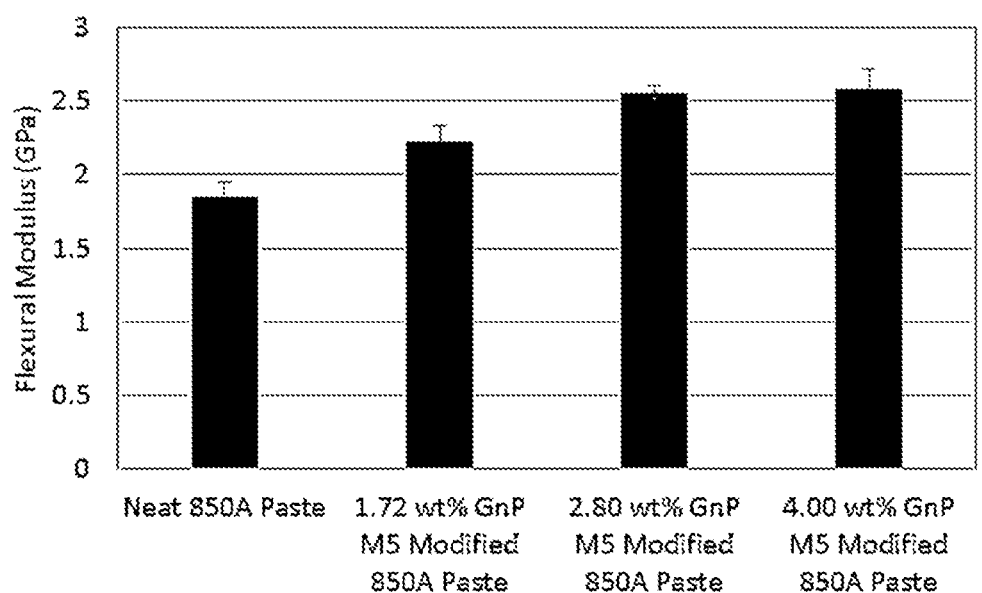
FIG. 4 is a bar graph of flexural modulus for the GnP modified SMC pastes of FIG. 1.

FIG. 4 shows the flexural modulus of neat and GnP modified SMC paste. At a concentration of 2.80 total weight percent GnPs, a 32.2% improvement in flexural modulus is observed. These results also show that improvements in flexural modulus plateau at 2.8 wt % GnP, Again, the incorporation of the rigid, high aspect ratio GnPs improve SMC paste modulus. The differences in the trends as a function of GnP concentration observed across the dynamic (see FIG. 3) and static (see FIG. 2) mechanical measurements may be due to the differences in loading rate and/or resulting boundary conditions.

Figure 5:
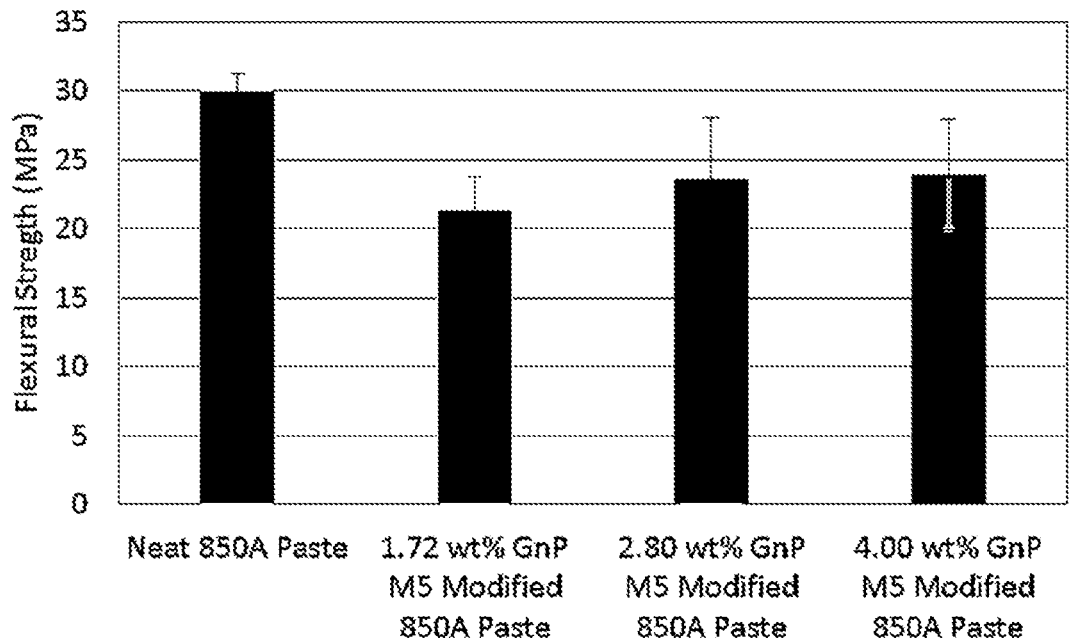
FIG. 5 is a bar graph of flexural strength for the GnP modified SMC pastes of FIG. 1.

FIG. 5 shows the flexural strength of neat and GnP modified SMC paste. At a concentration of 2.8 total weight percent GnP, a 23.5% reduction in flexural strength is observed. The reduction in SMC paste strength is hypothesized to be due to poor interfacial adhesion between the GnP basal plane and the surrounding polymer matrix.

Figure 6:
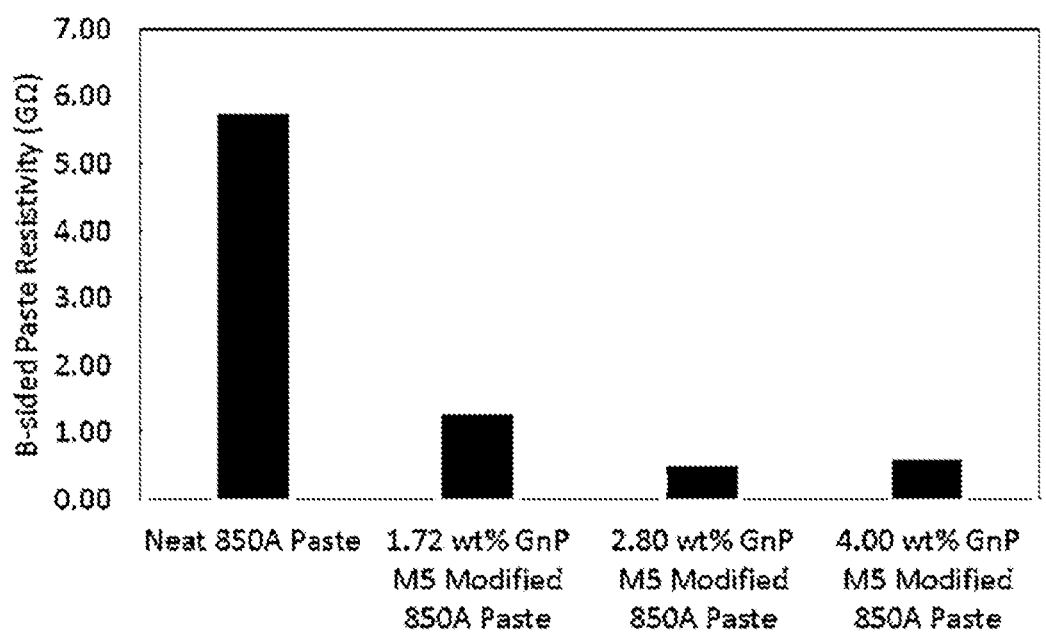
FIG. 6 is a bar graph of B-sided paste resistivity for the GnP modified SMC pastes of FIG. 1.

Electrical properties of neat and GnP modified SMC paste are as follows:

The resistivity of B-sided SMC paste containing concentrations of 0, 1.72, 2.80 and 4.00 total weight percent GnPs, respectively, is shown in FIG. 6. A resistivity of less than 1.0 GO is sufficient for electrostatic painting applications. Thus, it is observed that B-sided paste containing at least 2.8 wt % GnPs is sufficiently conductive for electrostatic painting.

Table 1 summarizes the surface resistivity of molded SMC paste plaques containing concentrations of 0, 1.72, 2.80 and 4.00 total weight percent GnPs. It is observed that at 4 total weight percent GnPs, SMC paste plaques are sufficiently conductive for electrostatic painting. It is noted that a surface resistivity less than 1.0 GO is in the sprayable range for electrostatic painting.

TABLE 1

Surface Resistivity versus concentration of GnP in SMC paste (total weight percent)

| Concentration of GnPs in SMC Paste | Surface Resistivity (GΩ) |
|---|---|
| 0 | Infinity |
| 1.72 | Infinity |

TABLE 1-continued

Surface Resistivity versus concentration of
GnP in SMC paste (total weight percent)

| Concentration of GnPs in SMC Paste | Surface Resistivity (GΩ) |
|---|---|
| 2.80 | Infinity |
| 4.00 | 0.10 |

Example 3—Turbostratic Carbon Dispersion in SMC Resin and Characterization

The process of Example 1 is repeated with turbostratic carbon (Cat No. 699624, Sigma-Aldrich) in place of the GnP. The resulting SMC resin paste in uncured and cured form is evaluated as detailed in Example 2 with similar results being obtained to GnP.

Example 4—Exfoliated Graphite Nanoplatelets in SMC Resin and Characterization

The process of Example 1 is repeated with the exfoliated GnPs in place of the GnP and a commensurate reduction in the amount of calcium carbonate filler. The resulting SMC resin paste in uncured and cured form is evaluated as detailed in Example 2 with similar results except that the total weight percentage required for electrostatic painting is reduced from 4.00 total weight percent to 2.8 total weight percent.

Example 5—Graphitic Exfoliation Process

GnPs having a higher e− conductivity across the basal plane and a nominal maximal linear extent of 7 microns as compared to the GnP of Example 1 with a nominal maximal linear extent of 5 microns are dispersed via ultrasonication in water containing the polyelectrolyte poly(sodium 4-styrene sulfonate) (PSSS). The resulting mixture is then blended spherical calcium carbonate, which is a commonly used filler in SMC. The resulting slurry is mechanically mixed before filtering and vacuum drying to a powder. Table 2 summarizes properties of the higher conductivity GnP with the larger basal plane.

TABLE 2

Material properties of GnP with a nominal maximal
linear extent of 7 microns and higher conductivity

| | Parallel to surface | Perpendicular to surface |
|---|---|---|
| Density (g/C$^3$) | 0 | 2.2 |
| LOI-Loss of Ignition (wt %) | ≥99.0 | ≥99.0 |
| Thermal conductivity (W/m · K) | 3,000 | 6 |
| Thermal expansion (m/m/K) | 4-6 × 10$^{-6}$ | 0.5-1.0 × 10$^{-6}$ |
| Tensile modulus (MPa) | 1,000 | NA |
| Tensile strength (MPa) | 5 | NA |
| Electrical conductivity (S/m) | 10$^7$ | 10$^2$ |

Figure 7:
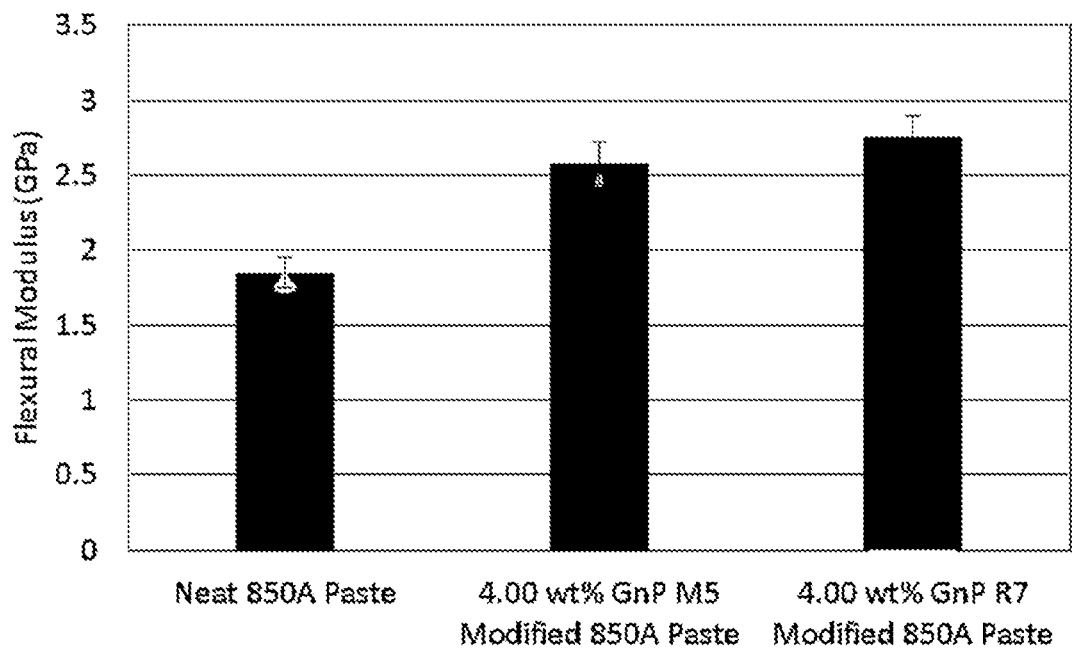
FIG. 7 is a bar graph of flexural modulus for the GnP modified SMC pastes with 0% GnP, SMC paste of FIG. 4 with 4.0% weight GnP, and a SMC paste with a grade of GnP at 4.0% weight with a larger basal plane diameter and a higher electron (e) conductivity across the basel plane.
Figure 8:
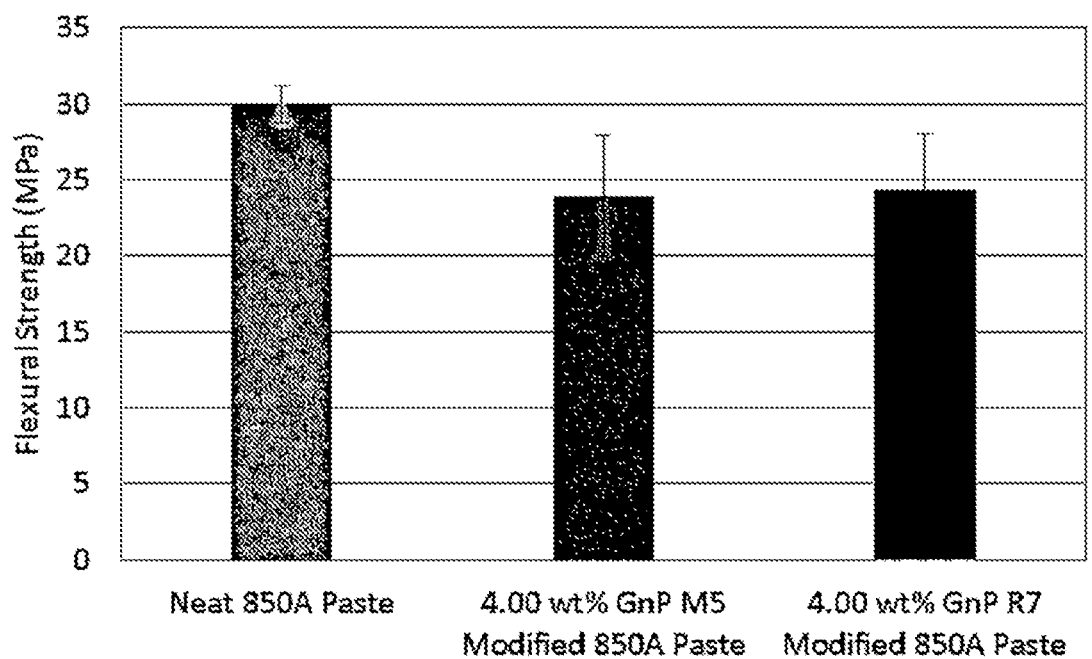
FIG. 8 is a bar graph of flexural strength for the GnP modified SMC pastes with 0% GnP, SMC paste of FIG. 5 with 4.0% weight GnP, and a SMC paste with a grade of GnP at 4.0% weight with a larger basal plane diameter and a higher electron (e) conductivity across the basal plane.

FIG. 7 is a bar graph of flexural modulus for the GnP modified SMC pastes with 0% GnP, SMC paste of FIG. 4 with 4.0% weight GnP, and a SMC paste with a grade of GnP at 4.0% weight with a larger basal plane diameter and a higher electron (e) conductivity across the basal plane. FIG. 8 is a bar graph of flexural strength for the GnP modified SMC pastes with 0% GnP, SMC paste of FIG. 5 with 4.0% weight GnP, and a SMC paste with a grade of GnP at 4.0% weight with a larger basal plane diameter and a higher electron (e) conductivity across the basal plane.

Patent documents and publications mentioned in the specification are indicative of the levels of those skilled in the art to which the invention pertains. These documents and publications are incorporated herein by reference to the same extent as if each individual document or publication is specifically and individually incorporated herein by reference. While the claimed invention has been illustrated in the foregoing description, the same is to be considered as illustrative and not restrictive in character. Therefore, it should be understood that only exemplary embodiments have been shown and described and that all changes and modifications that come within the spirit and scope of the claimed invention are desired to be protected.

The invention claimed is:

1. A thermoset molded article having a surface region and a central bulk region comprising:
    a thermoset resin formulation cured to define a matrix with a shape of the article; and
    a graphitic filler dispersed in the matrix, where said graphitic filler is functionalized to add covalently bonded hydrophilic moieties that promote preferential surface segregation of said graphitic filler, as opposed to homogenous dispersion through the central bulk region, where the surface region of the article has a greater concentration of said graphitic filler than the central bulk region.

2. The article of claim 1 wherein said graphitic filler is graphite nanoplatelets.

3. The article of claim 1 wherein said graphitic filler is exfoliated graphite nanoplatelets.

4. The article of claim 1 wherein said graphitic filler is turbostratic carbon.

5. The article of claim 1 further comprising a particulate filler of calcium carbonate, hollow micropheroids, or a combination thereof.

6. The article of claim 1 wherein said graphitic is present from 1 to 10 total weight percent.

7. The article of claim 1 wherein said graphitic is exfoliated and present from 0.01 to 1 total weight percent.

8. The article of claim 1 wherein the thermoset resin composition includes an unsaturated polyester or polyvinyl ester.

9. The article of claim 1 wherein the thermoset resin composition is a sheet molding composite paste.

10. The article of claim 1 wherein the surface region is adapted to receive a coating that renders the article with an automotive high gloss finish.

11. A method of electrostatically coating an article comprising:
    forming an article of claim 1;
    applying an electrical bias to the article to create a biased article;
    exposing the biased article to a coating precursor having an opposing electrical charge relative to the electrical bias; and
    allowing sufficient time for said coating precursor to form the electrostatic coating on the article.

12. A method for forming an exfoliated graphitic containing molded article comprising:
dispersing a graphitic in a solvent based dispersion or solution of a polyelectrolyte having a first counterion under conditions to allow said polyelectrolyte to intercalate to form a mixture;
exposing said mixture to a second counterion to form the exfoliated graphitic; and
admixing the exfoliated graphitic into a thermoset resin formulation as a graphitic filler; and
curing the thermoset resin formulation to form the thermoset molded article of claim 1.

13. The method of claim 12 wherein said solvent is water or a majority by weight water.

14. The method of claim 12 wherein the graphitic is graphite nanoplatelets.

15. The method of claim 12 wherein said first counterion is cationic and second counterion is one or more of calcium, magnesium, or aluminum.

16. The method of claim 12 wherein said polyelectrolyte is one or more of polyacrylic acid, polyacrylates, peptides with ionic R groups, or poly(sodium 4-styrene sulfonate).

17. The method of claim 12 wherein said dispersing and said exposing occur at ambient temperature of between 10 and 25° Celsius.

18. The method of claim 12 further comprising removing said solvent.

19. The method of claim 18 wherein the exfoliated graphitic is not exposed to heating during the removing of said solvent.

* * * * *